July 20, 1948.  P. KOPPERMAN  2,445,484
EXPANSION JOINT AND INTEGRAL ANCHOR
Filed Jan. 10, 1946

INVENTOR.
Paul Kopperman
BY Harry Langsam
ATTORNEY

Patented July 20, 1948

2,445,484

UNITED STATES PATENT OFFICE 2,445,484

EXPANSION JOINT AND INTEGRAL ANCHOR

Paul Kopperman, Philadelphia, Pa.

Application January 10, 1946, Serial No. 640,203

2 Claims. (Cl. 285—90)

My invention relates to an anchor base particularly adapted for a packless corrugated expansion joint.

Heretofore, packless corrugated expansion joints have been used but no provision has been made to anchor the joint itself but provision usually has been made to anchor the piping adjacent the expansion joint. In due course of time, the expansion and contraction of the joint results in the shifting or transverse movement of the parts comprising the joint due particularly to the fact that the joint is not properly supported.

There have been efforts made to support the joint, but these efforts have been exceptionally expensive and difficult to apply properly.

It is, therefore, an object of my invention to provide an expansion joint which may be bolted permanently in position.

Another object of my invention is to provide an expansion joint which has one end permanently bolted to a wall, ceiling, or other supporting member and where the remainder of the joint will not be harassed or stifled in its movement.

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description, when read in conjunction with the accompanying drawing, in which.

Figure 1:
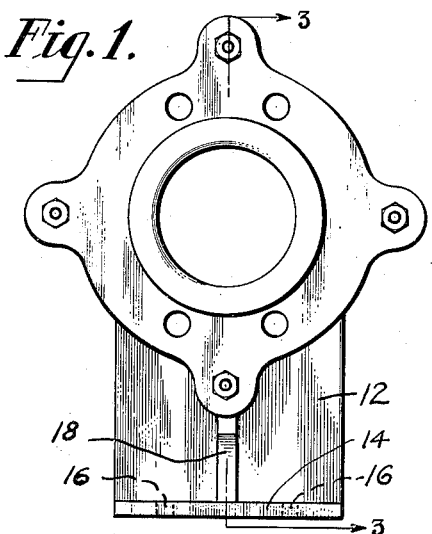
Fig. 1 is an end view of an expansion joint embodying my invention.
Figure 2:
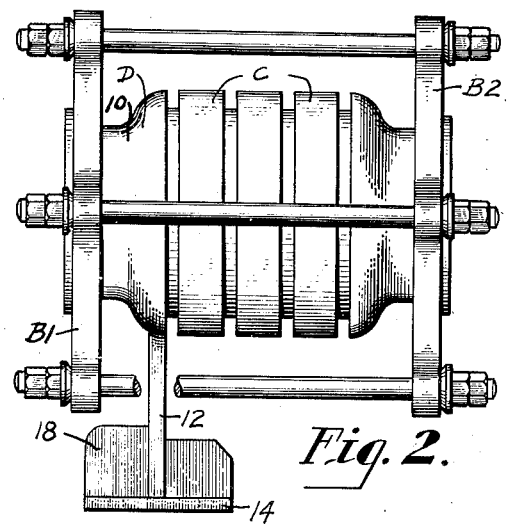
Fig. 2 is a side view of an expansion joint embodying my invention.
Figure 3:
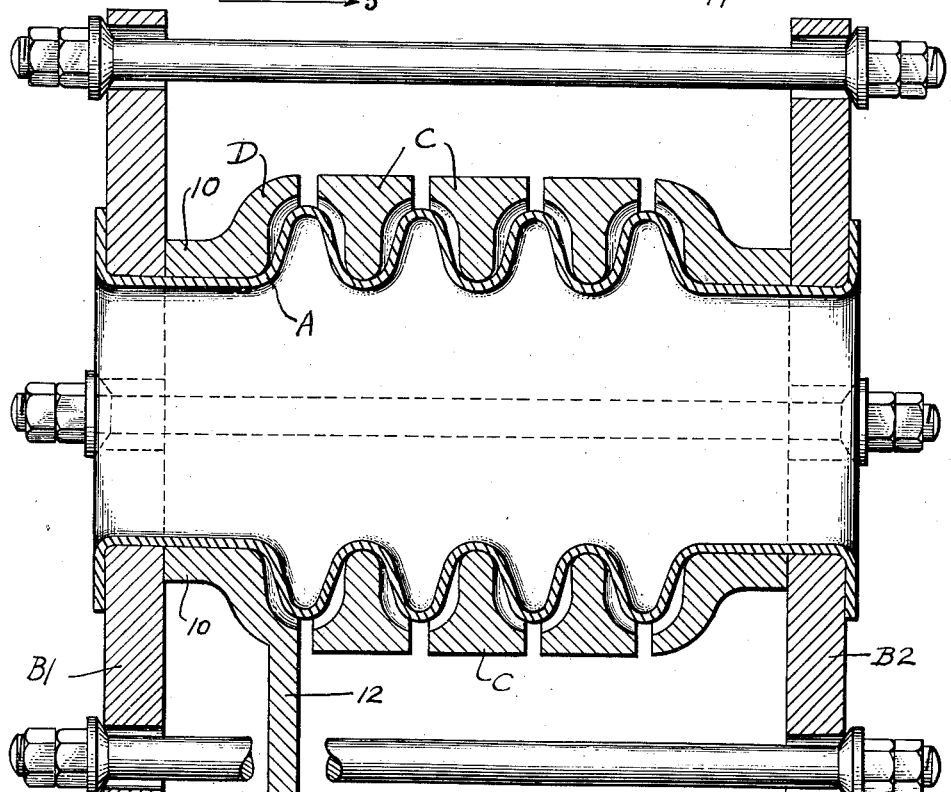
Fig. 3 is a view taken along the line 3—3 of Fig. 1.

Referring now in detail to the drawing, I show an expansion joint which is adapted to be coupled to two rigid lengths of conduit or pipe whereby heated gases, vapors, or liquids may be carried through the line; furthermore, the expansion of the rigid sections of the pipe will be carried by the expansion joint.

The expansion joint comprises a copper corrugated member, generally designated as A and a flange at each end, generally designated as B1 and B2, which flange may be bolted to the end of the rigid pipe section not shown.

Surrounding the expansion joint is a plurality of equalizing rings, generally designated as C, which rings prevent the deformation of the corrugated pipe A when the expansion joint is compressed.

One of the end equalizing rings, generally designated as D, has a portion 10 encircling a portion of the expansion joint A. Integrally formed with the ring portion 10 is a radially extending portion 12 which terminates in a flange or anchor 14, which flange may be bolted into a wall, or ceiling, or other types of support, since it has suitable holes 16 therein. A stiffening member 18 is also integrally formed with the ring member.

Although I have illustrated my invention as having a single permanent support therefor, I, also, may have a double expansion joint supported by a single anchor base permanently attached to a fixed member, or a double anchor base permanently attached to a fixed member. The double anchor is at the center of the unit.

Although my invention has been described in considerable detail, such description is intended as being illustrative rather than limiting, since the invention may be variously embodied, and the scope of the invention is to be determined as claimed.

I claim as my invention:

1. An expansion joint comprising a pair of rigid flanges, an expansion tubing attached to said flanges, a ring encircling a portion of said tubing, and means integrally formed with said ring to rigidly fasten said joint to a fixed member.

2. An expansion joint comprising a pair of rigid flanges, an expansion tubing attached to said flanges, a ring encircling a portion of said tubing, and an anchor integrally formed with said ring to rigidly fasten said joint to a fixed member.

PAUL KOPPERMAN.

REFERENCES CITED

The following references are of record in the file of this patent:

UNITED STATES PATENTS

| Number | Name | Date |
|---|---|---|
| 1,191,486 | Tyler | July 18, 1916 |
| 1,744,467 | Greene | Jan. 21, 1930 |
| 1,826,666 | Lawrence | Oct. 6, 1931 |
| 1,929,401 | Badger | Oct. 10, 1933 |
| 2,335,478 | Bergman | Nov. 30, 1943 |